United States Patent [19]
Quenot et al.

[11] Patent Number: 5,216,748
[45] Date of Patent: Jun. 1, 1993

[54] INTEGRATED DYNAMIC PROGRAMMING CIRCUIT

[75] Inventors: Georges Quenot, Chatillon; Jean-Jacques Gangolf, Janbville; Joseph Mariani, Paris; Jean-Luc Gauvain, Meudon La Foret, all of France

[73] Assignee: Bull, S.A., Paris, France

[21] Appl. No.: 785,917

[22] Filed: Nov. 4, 1991

Related U.S. Application Data

[63] Continuation of Ser. No. 750,751, Aug. 20, 1991, abandoned, which is a continuation of Ser. No. 278,545, Dec. 1, 1988, abandoned.

[30] Foreign Application Priority Data

Nov. 30, 1988 [FR] France .................... 88 15605

[51] Int. Cl.⁵ ............................... G10L 3/00
[52] U.S. Cl. ............................... 395/2
[58] Field of Search ............... 381/41-45; 395/2

[56] References Cited

U.S. PATENT DOCUMENTS

| | | | |
|---|---|---|---|
| 3,681,530 | 8/1972 | Manley et al. | 381/41 |
| 3,697,703 | 10/1972 | Clark, Jr. et al. | 381/41 |
| 4,184,049 | 1/1980 | Crochiere et al. | 381/41 |
| 4,567,606 | 1/1986 | Vensko et al. | 381/43 |
| 4,570,232 | 2/1986 | Shikano | 381/43 |
| 4,594,687 | 6/1986 | Kaneko et al. | 381/41 |
| 4,713,777 | 12/1987 | Klovstad et al. | 381/43 |
| 4,833,711 | 5/1989 | Ueda et al. | 381/43 |
| 4,852,172 | 7/1989 | Taguchi | 381/43 |

OTHER PUBLICATIONS

Sakoe and Chiba, "Dynamic Programming Algorithm Optimization for Spoken Word Recognition", IEEE Trans. on ASSP, vol. ASSP-26, No. 1, Feb. 1978, pp. 43-49.

"A Dynamic Time Warp VLSI Processor for Continuous Speech Recognition" Georges Quenot, Jean-Luc Gauvain, Jean-Jacques Gangolf and Joseph Mariani, Apr. 1986.

"A Dynamic Programming Processor for Speech Recognition", Georges Quenot, Jean-Luc Gauvain, Jean-Jacques Ganfolf, Joseph Mariani, May 1988.

Primary Examiner—David D. Knepper
Attorney, Agent, or Firm—Kerkam, Stowell, Kondracki & Clarke

[57] ABSTRACT

An integrated circuit includes parallel processors and is used for spoken word recognition. In order to provide a local equation which is programmable, a general purpose calculating processor includes a bank of registers, which bank is modified in configuration depending upon the values in a general mode GMOD register.

34 Claims, 13 Drawing Sheets

FIG.6

| Register: | GMOD=0 | GMOD=1 | GMOD=2 | GMOD=3 |
|---|---|---|---|---|
| R0 | W0 0 | W0 0 | W0 0 | S0 |
| R1 | W0 1 | W0 1 | W0 1 | S1 |
| R2 | W1 0 | W1 0 | W0 2 | S2 |
| R3 | W1 1 | W1 1 | W0 3 | S3 |
| R4 | W2 0 | W2 0 | W1 0 | S4 |
| R5 | W2 1 | W2 1 | W1 1 | S5 |
| R6 | W3 0 | W3 0 | W1 2 | S6 |
| R7 | W3 1 | W3 1 | W1 3 | S7 |
| R8 | W4 0 | W4 0 | W2 0 | S8 |
| R9 | W4 1 | W4 1 | W2 1 | S9 |
| R10 | W5 0 | W5 0 | W2 2 | S10 |
| R11 | W5 1 | W5 1 | W2 3 | S11 |
| R12 | W6 0 | S12 | S12 | S12 |
| R13 | W6 1 | S13 | S13 | S13 |
| R14 | W7 0 | S14 | S14 | S14 |
| R15 | W7 1 | S15 | S15 | S15 |
| R16 | S16 | S16 | S16 | S16 |
| R17 | S17 | S17 | S17 | S17 |
| R18 | S18 | S18 | S18 | S18 |
| R19 | S19 | S19 | S19 | S19 |
| R20 | S20 | S20 | S20 | S20 |
| R21 | S21 | S21 | S21 | S21 |
| R22 | S22 | S22 | S22 | S22 |
| R23 | S23 | S23 | S23 | S23 |
| R24 | S24 | S24 | S24 | S24 |
| R25 | S25 | S25 | S25 | S25 |
| R26 | S26 | S26 | S26 | S26 |
| R27 | S27 | S27 | S27 | S27 |
| R28 | MQ | MQ | MQ | MQ |
| R29 | L1 | L1 | L1 | L1 |
| R30 | C0 | C0 | C0 | C0 |
| R31 | C1 | C1 | C1 | C1 |

| LOGICAL NUMBER = content of X | CONTENT 2020 | CALCULATION STORAGE | LOGICAL NUMBER MSB \| LSB | T 2011 | LOGICAL NUMBER + T | CALCULATION STORAGE | T 2011 | LOGICAL NUMBER + T | CONTENT 2020 |
|---|---|---|---|---|---|---|---|---|---|
| R0  00 00 | W00 = g(t-4) | g(t) = W00 | xx  00 | 01 | R1 | g(t+1) = W01 | 10 | xx 10 = R2 | g(t+2) |
| R1  00 01 | W01 = g(t-3) |  | xx  01 | 01 | R2 |  | 10 | xx 11 = R3 | g(t-1) |
| R2  00 10 | W02 = g(t-2) |  | xx  10 | 01 | R3 |  | 10 | xx 00 = R0 | g(t) |
| R3  00 11 | W03 = g(t-1) |  | xx  11 | 01 | R0 |  | 10 | xx 01 = R1 | g(t+1) |
| R4  01 00 | W10 = b(t-4) | b(t) = W10 | xx  00 | 01 | R5 | b(t+1) = W10 | 10 | xx 10 = R6 | b(t+2) |
| R5  01 01 | W11 = b(t-3) |  | xx  01 | 01 | R6 |  | 10 | xx 11 = R7 | b(t-1) |
| R6  01 10 | W12 = b(t-2) |  | xx  10 | 01 | R7 |  | 10 | xx 00 = R4 | b(t) |
| R7  01 11 | W13 = b(t-1) |  | xx  11 | 01 | R4 |  | 10 | xx 01 = R5 | b(t+1) |
| R8  10 00 | W20 = d(t-1) | d(t) = W20 | xx  00 | 01 | R9 | d(t+1) = W20 | 10 | xx 10 = R10 | d(t+2) |
| R9  10 01 |  |  | xx  01 | 01 | R10 |  | 10 | xx 11 + R11 |  |
| R10 10 10 |  |  | xx  10 | 01 | R11 |  | 10 | xx 00 = R8 |  |
| R11 10 11 |  |  | xx  11 | 01 | R8 |  | 10 | xx 01 = R9 |  |
| t PHASE | | | | | t+1 PHASE | | | t+2 PHASE | |
| 0 MOD 2 | | | | | 1 MOD 2 | | | 0 MOD 2 | |

GMOD = 2

FIG.7

| X< AMOD | 2 | 4 | 6 | 8 |
|---|---|---|---|---|
| 1 | 10 | | | |
| 2 | | 10 | | |
| 3 | | | 10 | |
| 4 | | 11 | | |
| 5 | | | | 11 |

| CORRBIT 0 | CORRBIT 1 |
|---|---|

FIG.8 a) course

```
For t: 0 to TMAX do begin
  For p=1 to P do begin
    For i:=0 to Ip do begin
    ......
    end
  end
end
``` b) course

```
for p:=1 to P do begin
  for t:=0 to TMAX do begin
    for i:=0 to Ip do begin
    ......
    end
  end
end
``` c) course

```
for p:=1 to P do begin
  for i:=0 to Ip do begin
    for t:=0 to TMAX do begin
    ......
    end
  end
end
```

| | Schématic representation | Total distance Local equation : $g(t,i)=$ | Type |
|---|---|---|---|
| A) | ↗ | $\min \begin{cases} g(t,i-1) \\ g(t-1,i-1)+d(t,i) \\ g(t-1,i)+d(t,i) \end{cases}$ | asymetrical according test sequence |
| B) | ↗ | $\min \begin{cases} g(t,i-1)+d(t,i) \\ g(t-1,i-1)+2 \times d(t,i) \\ g(t-1,i)+d(t,i) \end{cases}$ | symetrical |
| C) | ↗ | $\min \begin{cases} g(t,i-1)+d(t,i) \\ g(t-1,i-1)+d(t,i) \\ g(t-1,i) \end{cases}$ | asymetrical according reference |
| D) | ⤴ | $\min \begin{cases} g(t-1,i-2)+d(t,i-1)/2+d(t,i)/2 \\ g(t-1,i-1)+d(t,i) \\ g(t-2,i-1)+d(t-1,i)+d(t,i) \end{cases}$ | asymetrical with slop |
| E) | ⤴ | $\min \begin{cases} g(t-1,i-2)+2 \times d(t,i-1)+d(t,i) \\ g(t-1,i-1)+2 \times d(t,i) \\ g(t-2,i-1)+2 \times d(t-1,i)+d(t,i) \end{cases}$ | symetrical with slop |
| F) | ⤴ | $\min \begin{cases} g(t-1,i-2)+d(t,i) \\ g(t-1,i-1)+d(t,i) \\ g(t-2,i-1)+2 \times d(t,i) \end{cases}$ | asymetrical simplified |
| G) | ⤴ | $\min \begin{cases} g(t-1,i-2)+3 \times d(t,i) \\ g(t-1,i-1)+2 \times d(t,i) \\ g(t-2,i-1)+3 \times d(t,i) \end{cases}$ | symetrical simplified |
| H) | ⤴ | $\min \begin{cases} g(t-1,i-1)+d(t,i) \\ g(t-1,i-2)+d(t,i) \\ g(t-1,i-3)+d(t,i) \\ g(t-1,i-4)+d(t,i) \end{cases}$ | |

FIG. 10

INTEGRATED DYNAMIC PROGRAMMING CIRCUIT

This is a continuation of application Ser. No. 750,751, filed Aug. 20, 1991, now abandoned, which in turn is a continuation of application Ser. No. 278,545 filed Dec. 1, 1988 also abandoned.

The present invention relates to an integrated dynamic programming circuit and its application to speech recognition.

Integrated dynamic programming circuits with sequential processors for permitting speech recognition are known. These processors process the three-dimensional volume comprising a reference table point by point. By parallel association of the processors, with one portion of the vocabulary assigned to each processor, recognition of isolated words can be performed. These processors generally include one specialized portion for calculating the distances with a specific cabled operator, one portion dedicated to calculating the local equation and complementary calculations, and sometimes another specialized portion for generating addresses for rapid access to the data. Nevertheless, most of these specialized processors have local equations that are set for a single application, and the coefficients by which the calculations of local distances are performed are limited in size and number, for reasons of capacity, calculation speed, and storage capacity for these coefficients. The majority of these circuits are accordingly limited in precision of the local distance computations, on the one hand, and on the other hand in speed of execution for performing recognition of connected words in real time. Finally, these known processors are also dependent on the local equation, which is set once and for all for a quite specific application.

A first object of the invention is accordingly to propose an integrated dynamic programming circuit that, by having a programmable local equation, enables adaptation to various applications.

This first object is attained in that the integrated dynamic programming circuit includes a circuit for interfacing with the data and address bus of a host system, said interface circuit being connected to an internal bus for access to a local memory containing both a reference matrix, as well as to a sequencing processor;

to an instruction decoding and check logic circuit and to a program memory, the internal bus also being connected in parallel to a unit including a distance calculating processor;

to a unit including an address calculating processor;

to a unit including a general purpose calculation processor, and is characterized in that the general purpose calculating processor is associated with a set of working registers, the number of which is programmable by a GMOD register as a function of the requirements of the programmable local equation, which permits determination of the optimal route for arriving at a point (i, j) and consequently the recognition of a word with respect to a reference matrix, and in that the address calculation processor includes a specialized circuit for calculating the physical addresses of the register in which the general purpose calculating processor performs the calculations corresponding to the local equation.

A second object is to improve the performance of the dynamic programming circuit in such a way as to permit recognition of connected words.

This object is attained in that the dynamic programming circuit includes a specialized circuit that, in order to determine the two least significant bits of the physical address, comprises an adder receiving on the one hand the two least significant bits of the logical address of one of the registers in which the calculations are performed and also two bits comprising the two outputs of two AND gates each receiving one of the two least significant bits, and the output of a circuit that determines the correction to be performed performs this correction when the logic number is less than 8.

In another characteristic, the circuit determining the correction to be performed includes a logic circuit (20105) furnishing two correction outputs CORRBIT0 and CORRBIT1, respectively, for correcting the least significant bit and the next-least significant bit as a function of values furnished by a register (AMOD, GMOD) and by a comparator circuit (20100B) with each of the predetermined values (2, 4, 6, 8).

In another characteristic, the specialized circuit, for determining the least significant bit of the physical address, includes an EXCLUSIVE OR gate associated with an inverter receiving at a first input the least significant bit of the logical address of the registers, and the output of an AND gate having two inputs, of which one of the inputs receives the least significant bits and the other receives the output of a circuit that on the basis of the four address bits determines whether the logical address is less than 4, or not.

Another object of the invention is to enable performing recognition in real time by executing calculations while the utterance is being spoken.

This object is attained in that the calculations for distance and the local equation are effected along the axis of the test sequence, which is stored in the external working memory along with its intermediate results.

Another object of the invention is to propose a speech recognition system using the dynamic comparison microprocessor.

This object is attained in that a plurality of dynamic comparison microprocessors associated with local memories are mounted in parallel on a local bus, on which an aquisition and analysis module and an interface check module are connected in parallel, each local memory including one portion of the reference memory comprising a given coefficient method obtained by the following steps:

predistortion, by filter, of the first order equation $yn = xn - \alpha xn - 1$, where xn is a sequence of samples from the analog/digital converter after preamplification and filtering by a low-pass filter, reduction of the coefficient number to 128 by Fourier transform calculated for the result of the product of the signal by the function "1+cosine";

smoothing of the energy curve by multiplication with a train of trigonometric functions, and calculation of the integral of the result, for reducing the coefficient number from 128 to 16;

quasi-logarithmic transformation for changing a 16-bit representation of the coefficients to an 8-bit representation;

linear combination of the coefficients by Fourier transform processing into a cosine with 16 parameters;

nonlinear temporal compression by using the Minkowski distance between vectors.

Further characteristics and advantages of the present invention will become more apparent from the ensuing detailed description, taken in conjunction with the accompanying drawings. in which.

Figure 4:
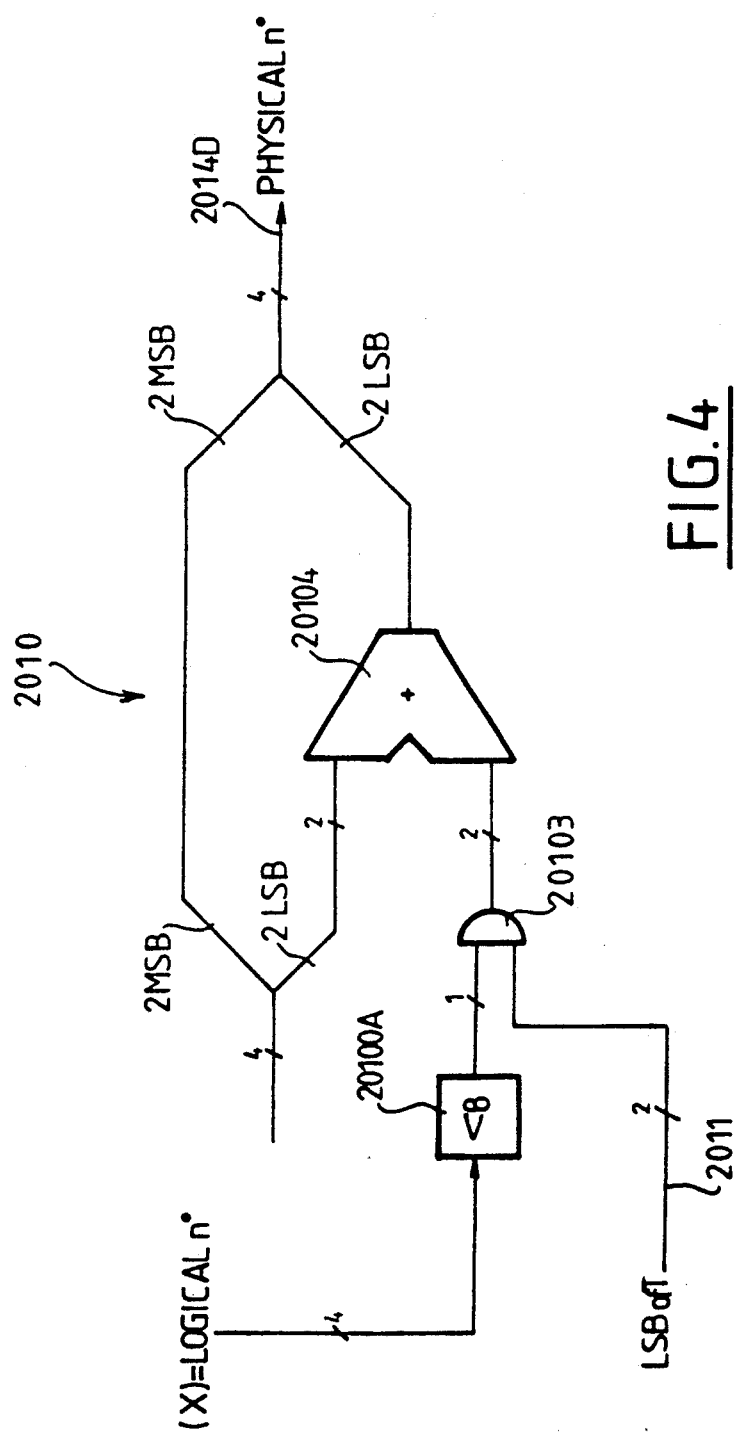
Figure 5:
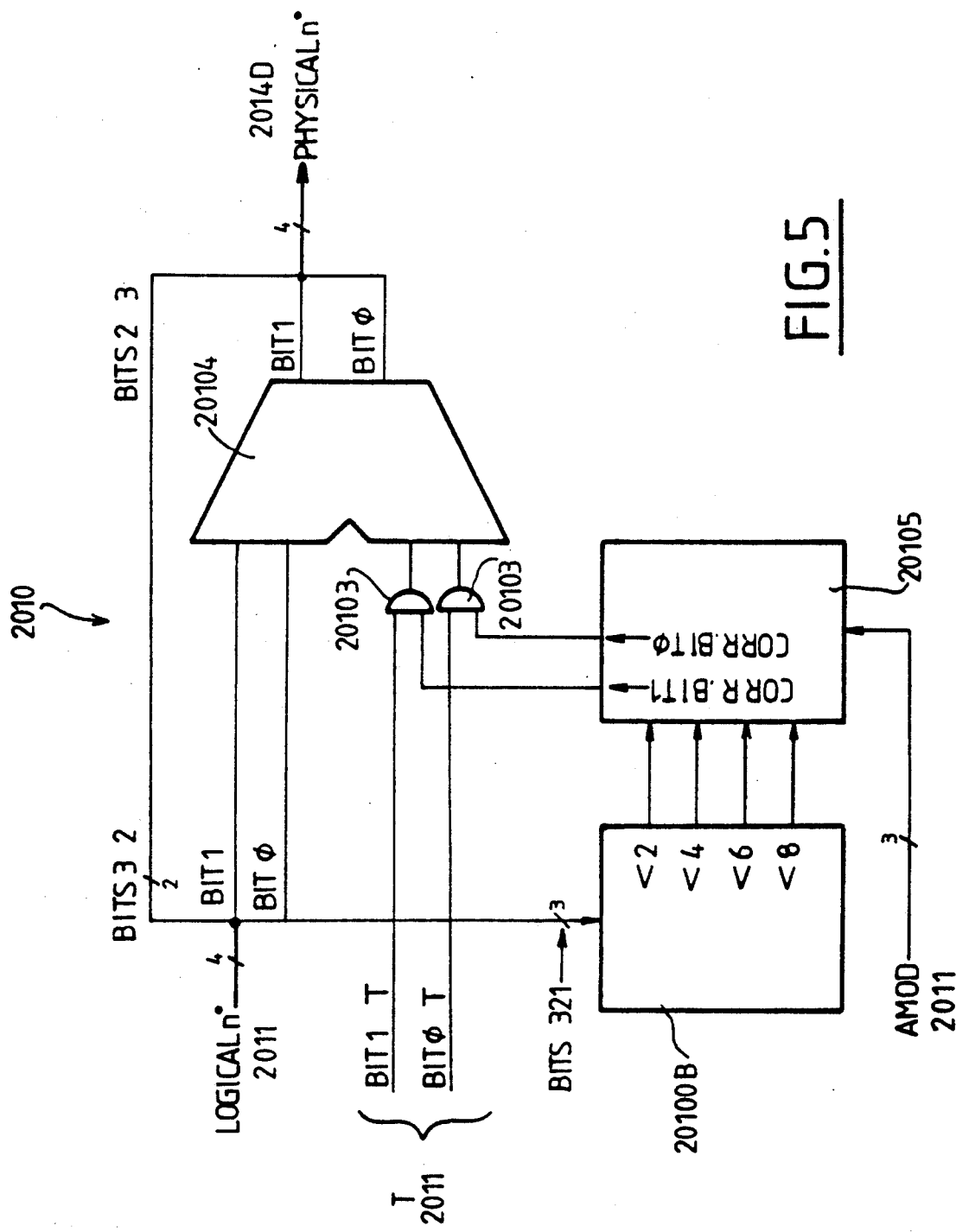

FIG. 4 a second exemplary embodiment of the address calculating circuit in the case of quadrivectors;

FIG. 5 shows the preferred embodiment of the address calculating circuit of the invention;

FIG. 6 shows the distribution of the scalar and vectorial registers in the memory comprising the working registers.

FIG. 7 is a table of the development of the contents of the vectorial registers;

FIG. 8 shows the logic table of the output values of the logical circuit used in the embodiment of FIG. 5.

Figures 9A, 9B, 9C:
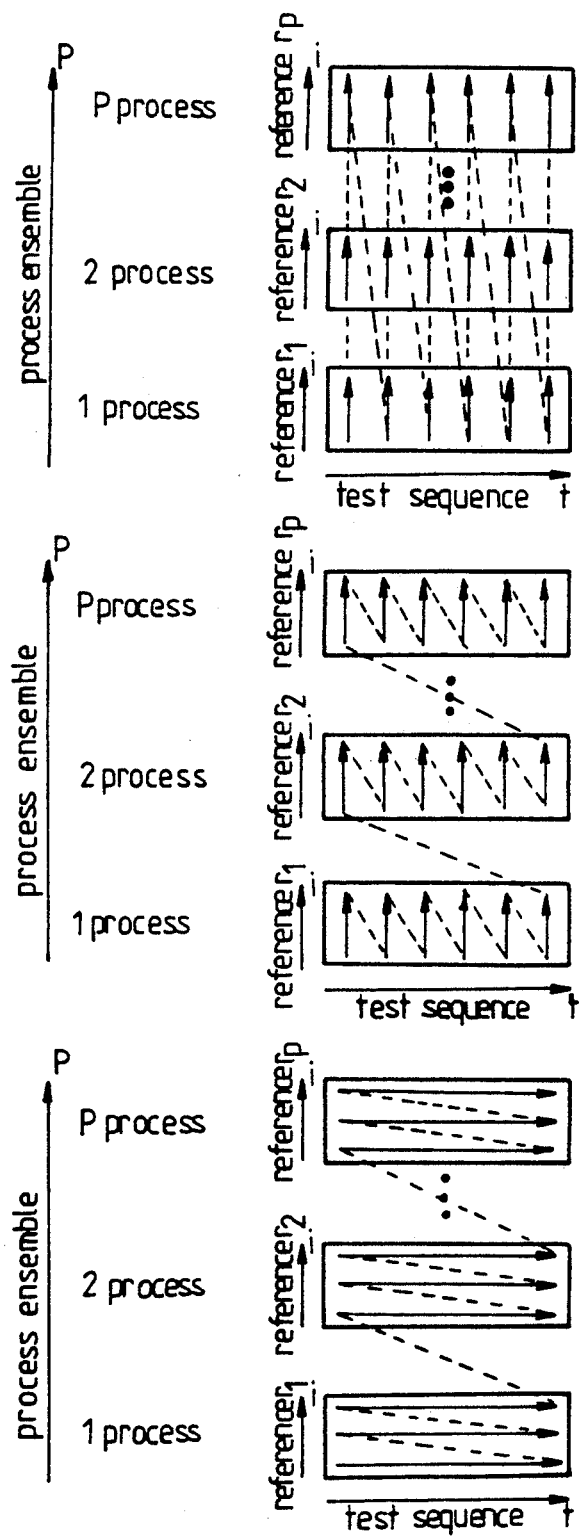

FIGS. 9A, 9B and 9C show the various ways in which the distance calculation can be performed;

FIG. 10 shows various types of local equations for calculating the accumulated distance.

In the discussion of specific structures for the present invention certain registers may be named with abbreviations, such as GMOD, meaning general mode. However, other registers will simply have notation used to distinguish them from each other in accord with usual practice in this field.

Figure 1:
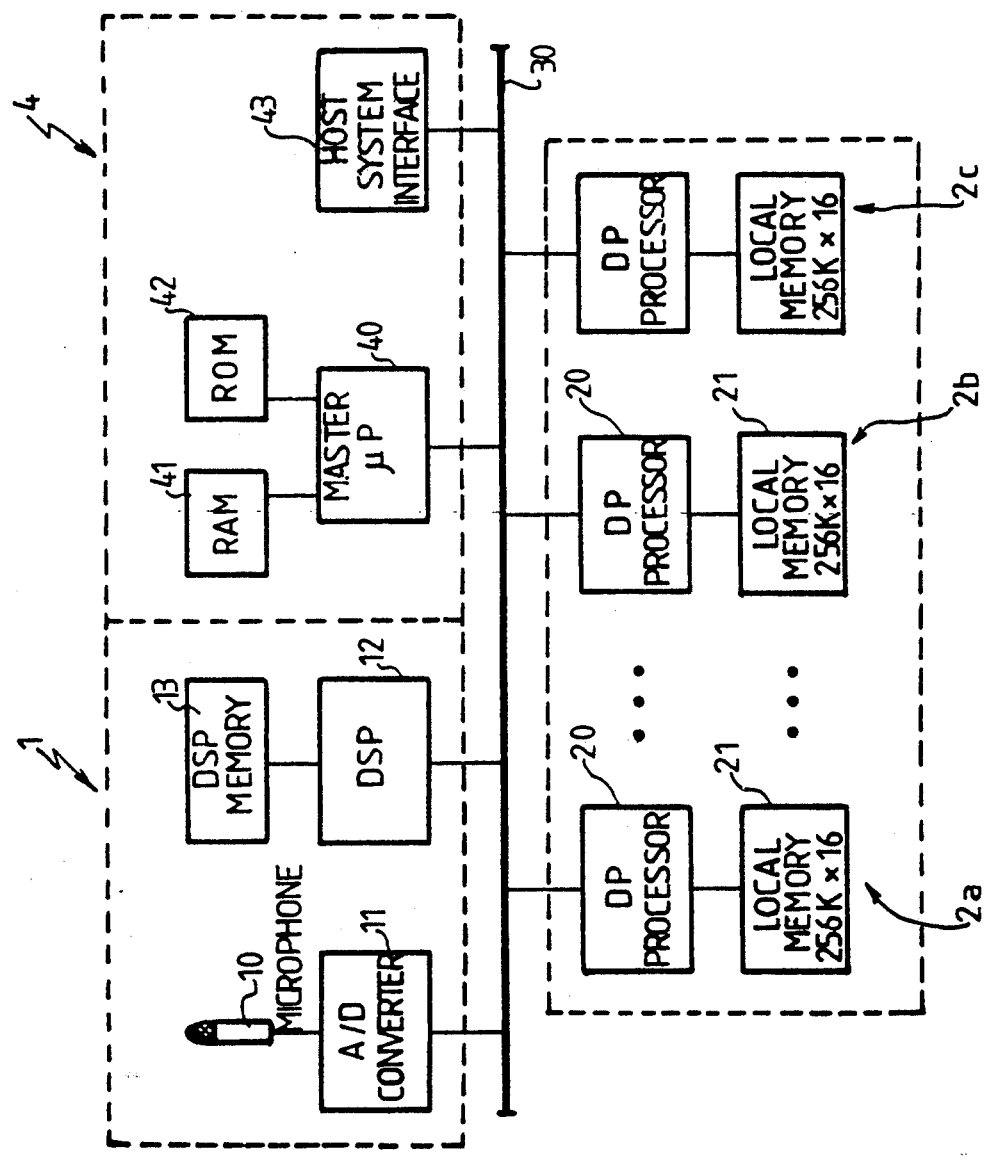
FIG. 1 is a schematic view of a speech recognition system using the integrated dynamic comparison circuit.

The speech recognition system shown in FIG. 1 includes an aquisition and analysis module (1) comprising a microphone (10), an analog/digital converter circuit (11) connected to a local bus (30) and via this local bus to a signal processor unit (12) and a memory (13) of the signal processor unit. This memory (13) contains the programming instructions of the processor (12). The local bus (30) is connected to a set of comparison modules (2a, 2b, 2c) in which each module includes a dynamic comparison microprocessor (20) associated with a local memory (21). Each comparison module (20, 21) is connected in parallel to the local bus (30) and connected by this bus to a check and interface module (4) comprising a general purpose processor (40) associated with a random access memory (41), a read-only memory (42) and an application interface (43). The role of the general purpose processor (40), known as the master processor, is simplified by this architechture. During the learning phase, it remote-loads the reference acoustic shapes into the local memories of the dynamic comparison processors (20). Prior to the recognition, it remote-loads the recognition programs into the program memories of these processors (20) and initializes them. During the recognition, it translates the events of the test sequence from the analysis module 1 to the processors (20), manages the dialogue between them and manages the dialogue with the application.

Figure 2A:
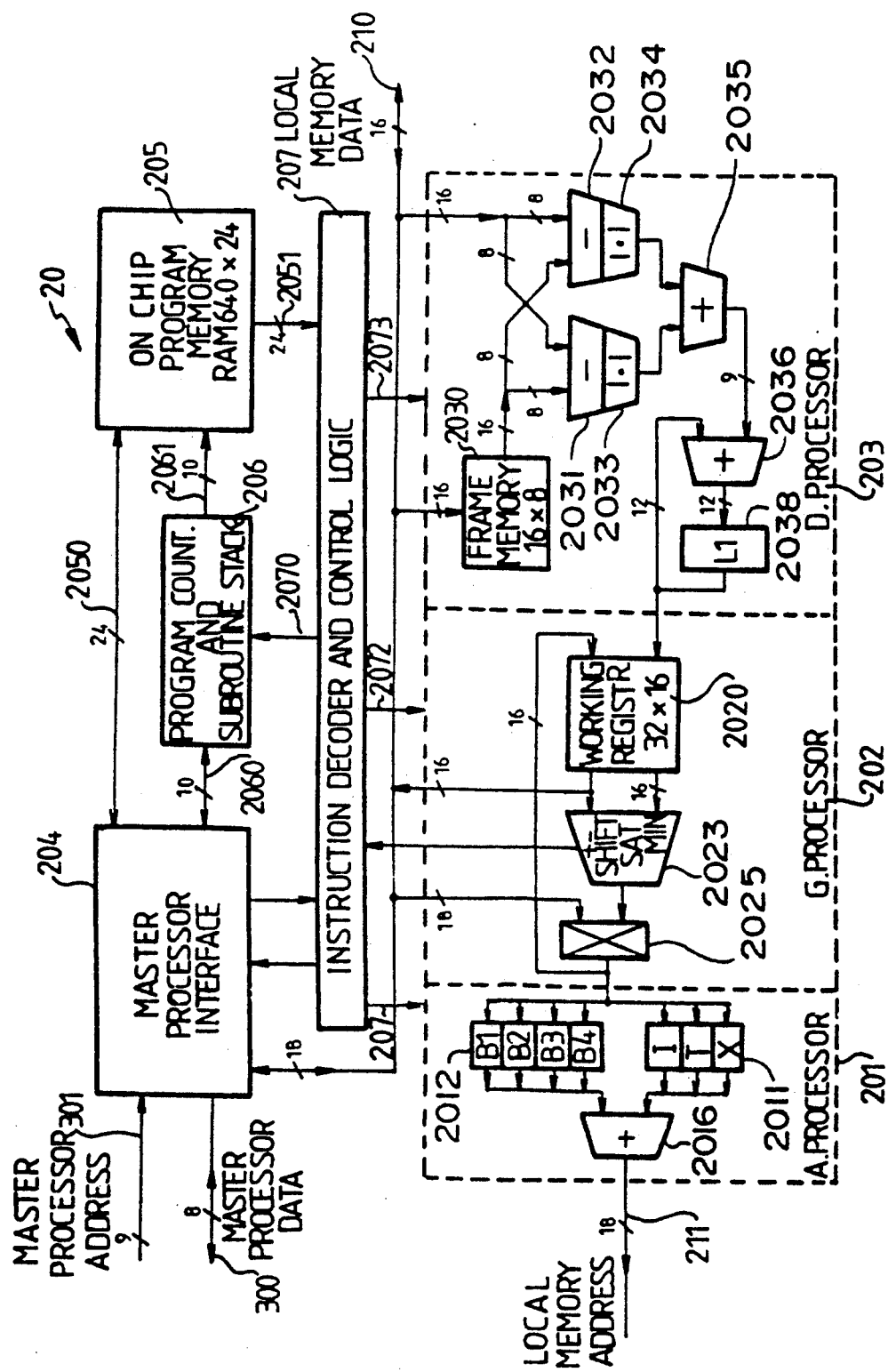
FIG. 2A shows the internal architechture of the dynamic comparison circuit.

Each dynamic comparison processor (FIG. 2A) communicates via an eight-line data bus (300) with the master processor (40) and via a nine-line address bus (301) with this same master processor (40). The buses (300) and (301) comprise a sub-bus of the local bus (30). The dynamic comparison processor (20) also communicates via an 18-line address bus (211) with the local memory (21) and via a 16-line data bus (210) with the data of the local memory (21). This processor includes an address calculation unit (201) or A processor, a general purpose calculation unit (202) or G processor, and a distance calculation unit (203) or D processor; these three units are connected in parallel on the data bus (210) originating in the local memory (21).

Each dynamic comparison microprocessor (20) also includes an interface circuit with the master processor interface (204) connected to the address and data buses (301) and (300), respectively, and to the bus of the local memory (210). This master interface procesor (204) is also bidirectionally connected to a circuit (207) that decodes instructions and includes the checking logic. This decoder circuit (207) assures the control of each of the three processors (201, 202, 203) via a specific control line (2071, 2072, 2073, respectively). Similarly, this circuit (207) assures checking via a control line (2070) of a circuit (206) comprising a sequencer or S processor. This sequencer (206) is connected via a 10-line bidirectional bus (2060) to the interface (204) and by 10-line output bus (2061) to the program memory (205) comprising a random access memory of 640 24-bit words. This RAM (205) is connected via a 24-line bus (2050) to the interface circuit (204) and by a second 24-line bus (2051) to the decoder and check circuit (207). The G processor circuit (202) includes a bank (2020) of 32 16-bit working registers, each addressed by the instruction decoder circuit (207) via the connecting line (2072). The D processor (203) includes a 16-octet spectral memory (2030).

The purpose of this dynamic comparison microprocessor (20) is to permit word recognition by evaluating a distance between acoustical images. In the first learning phase, the general purpose processor (40) remote-loads the acoustical reference shapes into each of the local memories (21) associated with each of the dynamic comparison processors (20).

During the recognition phase, the master processor (40) transmits the test sequence events from the analysis module to the spectral memory (2030) of the distance calculation processor (203).

Recognition of words spoken or of information stored in the reference matrices by a non-linear compression method improves the quality of the comparison, because it partially compensates for variations in rhythm. Since it is difficult to know the law of nonlinear variation, the method selected is to calculate the distance between the reference acoustical image and the test sequence image for all the possible correspondences with respect to a certain number of constraints, and to choose the one which minimizes this distance as the optimal correspondence. This method comprises solving the problem of global optimization by converting it into the solving of a recurrent equation, which makes it possible, based on the local distances between the point "t" and the point "i" and a propagated tag b(ti) which depends on the route taken, to determine the accumulated distance between the point "0, 0" and the point "t, i". Different types of local equations defined as a function of the route taken are shown in FIG. 10. The accumulated distance may thus be expressed, for a certain type of constraint on the route taken, by the following set of equations:

$$(g(t-2, i-1)+d(t-1,i)+d(t,i)) \quad (a)$$

$$g(t, i) = \min \; (g(t-1, i-1)+d(t,i)) \quad (b)$$

$$(g(t-1, i-2)+\tfrac{1}{2}d(t,i-1)+\tfrac{1}{2}d(t,i)) \quad (c)$$

These equations correspond to the equations E of FIG. 10, taking into account an arithmetic route with the slope constraints indicated in the schematic representation column.

$$b(t, i) = \begin{cases} (b(t-2, i-1) & \text{if (a) is minimum} \\ (b(t-1, i-1) & \text{if (b) is minimum} \\ (b(t-1, i-2) & \text{if (c) is minimum} \end{cases}$$

Here, $d(t,i)$ is a distance calculated locally by the D processor (203) without recurrence. The local distance $d(t,i)$ can be expressed in the form of one of the two following equations respectively representing Minkowski distances of the first order and of the second order:

$$d(t,i) = \Sigma |a_{tp} - b_{ip}|$$

or $$d(t,i) = (\Sigma |a_{tp} - b_{ip}|^2)^{\tfrac{1}{2}}$$

In this formula, $a_{tp}$ are the coefficients assigned to the spectral memory and represent the test sequence events, and $b_{ip}$ are the reference parameters assigned to the local memory (21) (reference matrix). The parameters $a_{tp}$, $b_{ip}$ representing the event sequence or the reference matrix are each made up of 16 eight-bit coefficients and are obtained by the following processing. The reference parameters are obtained in an aquisition step of the reference matrix by signal processing, this processing being comprised as follows:

a step of predistortion by filter of the first order equation $y_n = x_n - \alpha.x_n - 1$, where $x_n$ is a sequence of samples coming from an analog/digital converter after preamplification and filtration by a low-pass filter;

the obtaining of 128 coefficients by calculation of a Fourier transform on the result of the product of the signal resulting from the predistortion by the (1+cosine) function;

smoothing of the energy curve by multiplication with a sequence of trigonometric functions and calculation of the integral of the result, to reduce the number of coefficients from 128 to 16;

quasi-logarithmic transformation to change from a 16-bit representation of the coefficients to an eight-bit representation;

nonlinear temporal compression by using the Minkowski distance of the first order between vectors to reduce the number of vectors in the stable portions of the input signal.

Similarly, in the course of the recognition, the test sequence events undergo the same processing and make it possible to obtain a vector $a_{tp}$ comprising 16 coefficients represented by eight bits.

If the reference events and the test sequence events are to be represented by vectors of eight coefficients of eight bits, then before the temporal compression step, the processing method has an added step of linear combination of the coefficients by processing with a Fourier transform in cosine, to reduce the number of coefficients from 16 to 8.

Figure 2B:
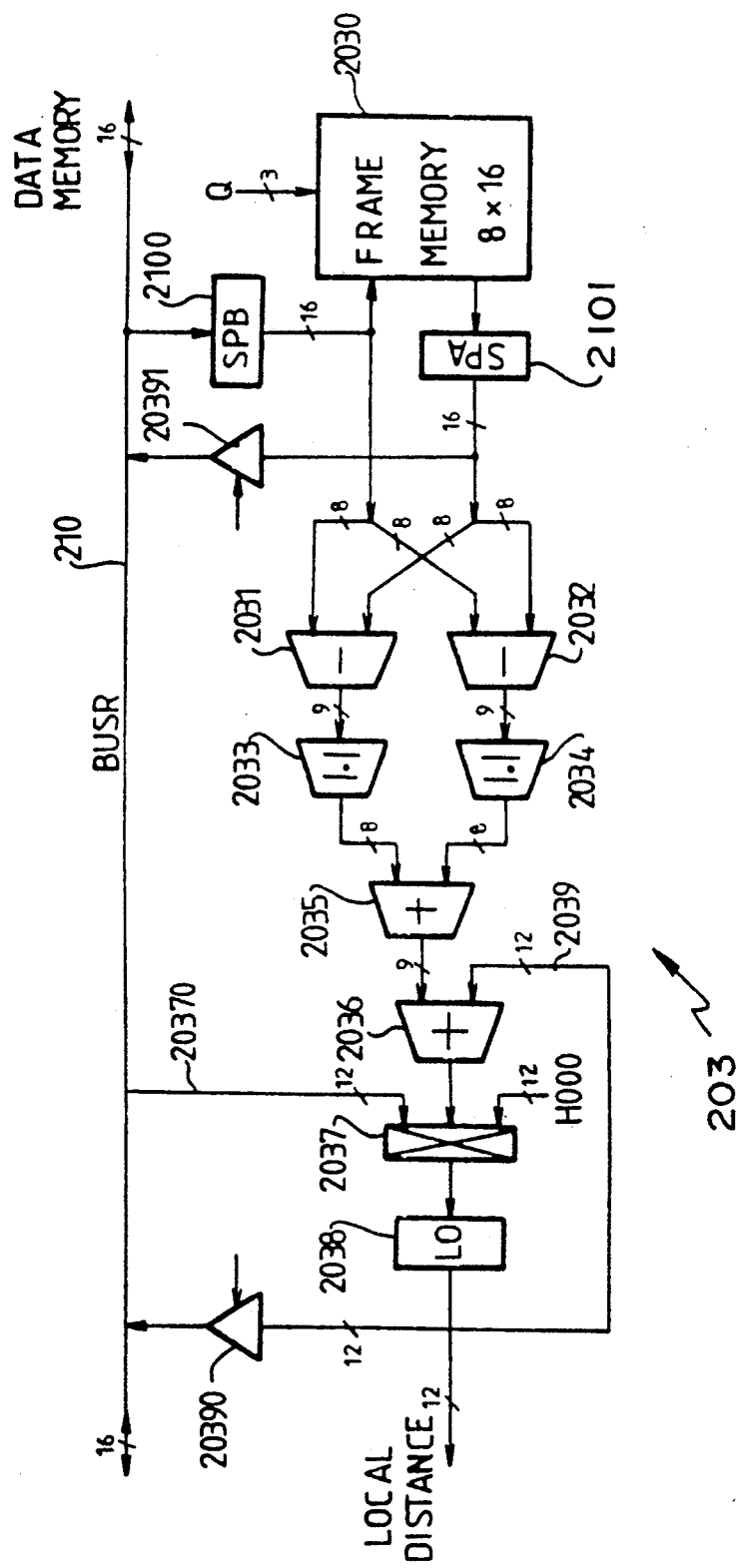
FIG. 2B is the functional diagram for the distance calculating processor.

The calculation of the first order Minkowski distance is performed by the D processor shown in greater detail in FIG. 2B. The spectral memory (2030) capable of containing 16 octets will contain a vector $a_{tp}$ of the test sequence event, while the reference matrix vector $b_{ip}$, which will permit calculation of the Minkowski distance, arrives via the bus (210) connected to the local memory (21). The first 16 bits of the vector $b_{ip}$, temporarily stored in a buffer (SPB) (2100), are sent over two subtractor stages (2031, 2032) acting on eight bits so as to process two octets in parallel, comprising one 16-bit word. The nine output lines of each of the subtractor stages (2031, 2032) are each sent over a circuit (2033, 2034, respectively), that calculates the absolute value, the eight outputs of which are sent to the 16 inputs of an adder stage (2035). The first 16 bits of the vector $a_{tp}$ of the test sequence are sent through the buffer register (SPS) (2101) of the eight inputs of the two subtractor stages (2031, 2032). Thus the Minkowski distance is available, calculated for the first 16 bits of the reference and test sequence vectors, at the output of the adder stage (2035). To continue calculating the other 14 eight-bit coefficients of the reference and test vectors, it is sufficient to re-send, via a connector (2039), the result obtained at the input of an adder (2036) and to add this to the result from the output (2035), which in the following step comprises the distance calculated for the third and fourth octets of the sequence test and reference vectors. Thus the distance calculating processor can calculate a distance for 16 coefficients in nine cycles, that is, one initializing cycle and eight accumulation cycles. The result of the adder (2036) is sent over a multiplexing circuit (2037), and the output of the multiplexer (2037) is sent to a 12-bit accumulator (2038), which enables storage of the local distance in the course of calculation and re-sending of this value to the 12 input lines of the adder (2036) via the connection represented by the reference (2039).

A three-state amplifier (20390) receives the 12 outputs of the accumulator (2038) and makes it possible to send them over the internal bus of the dynamic comparison processor (210). Similarly, a second three-state amplifier (20391) makes it possible to send the contents of the register SPA over the bus (210). The multiplexer circuit (2037) makes it possible to initialize the register (2038) to zero for the beginning of a distance calculation, or to load L0 with a value of 12 bits coming from the internal bus (210) via a connector (20370).

The local distance $d(t,i)$ is used by the general purpose calculator processor (202) to calculate the accumulated distance between the point (0, 0) and the point (t, i).

Figure 2C:
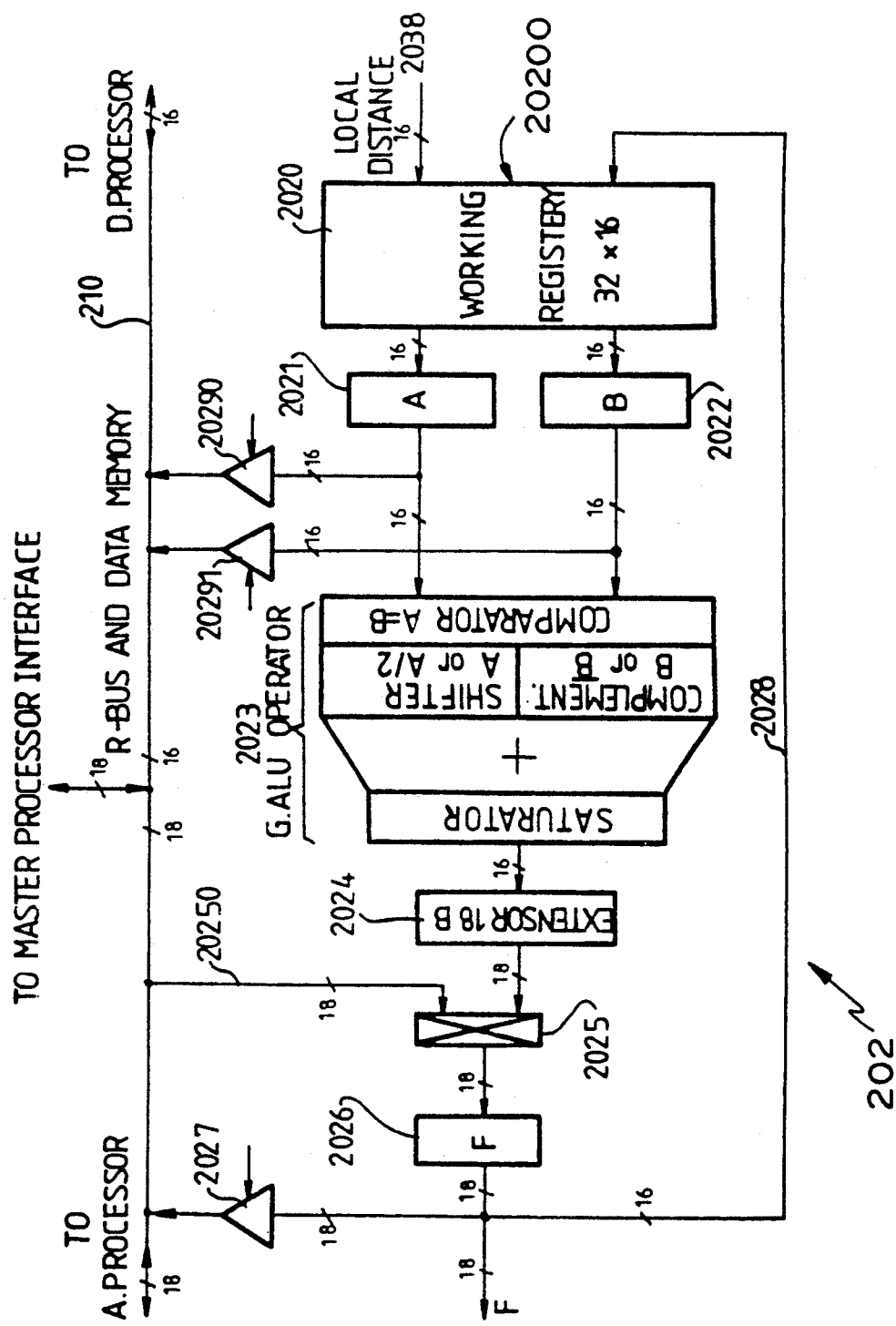
FIG. 2C is the functional diagram of the general purpose calculating processor.

This general purpose calculating processor (202), shown in detail in FIG. 2C, includes a working register bank (2020) comprising 32 16-bit registers, each of which receives at its 16 inputs the output of the buffer register (2038) of the distance processor (203). The contents of the two 16-bit registers are sent, one to a buffer register (2021) and the other to a second buffer register (2022). The first buffer register is connected first to an operator (2023) and second, via three-state amplifiers (20290), to the bus (210). Similarly, the second buffer register (2022) is connected first to the operator (2023) and second, via three-state amplifiers (20291), to the bus (210). The operator (2023), depending on the contents of the instructions stored in the program memory (205), makes it possible to perform a comparison operation, a saturation operation, an additional operation, an operation of complementing the information furnished by the second register (2022), or an operation of shift with respect to the information furnished by the first register (2021). This shift operation makes it possible, for example, to divide the value contained in the register (2021) by two. The 16 outputs of the operator (2023) are sent to an 18-bit extender register (2024). The 18 outputs of this extender register are sent to a multiplexer (2025), which at its other 18 inputs (20250) receives the signals furnished by the 18 data bus lines (210). The 18 outputs of the multiplexer (2025) are sent to a buffer register (2026), the outputs of which are fed back to the bank of working registers (2020) via the lines (2028). The 18 outputs of the buffer registers (2026) may also be sent via three-state amplifiers (2027) to the data bus (210). Thus taking expression "a", $g(t-2, i-1)+d(t-1, i)+d(t,i)$, which makes it possible to determine the accumulated distance $g(ti)$, the value $g(t-2, i-1)$ will be furnished by one of the registers of the bank (2020) to the buffer register (2022), while the value $d(t,i)$ will be furnished by the calculating processor (2038) and sent to the register (2021).

In a first time period, the operator (2023) will perform an addition operation, commanded by the instruction, and the result fed back via the lines (2028) will be sent to the register (2022), while the register (2021), for example, will receive the working register which contains the information $d(t-1, i)$. The expression "a" will be calculated in this way. After having calculated the expressions "a, b, c", the operator (2023) will send the result, comprising the minimum expression furnished in two time periods (conditional affectation comparison) via the operator (2023) to either the bus (2010) or the address processor (201). The bank of working registers (2020) may be configured differently, depending on the values specified in a general mode or GMOD register (20110, FIG. 2D). Depending on the values contained in this two-bit GMOD register, the configuration of the bank of registers (2020) may be that corresponding to one of the four columns shown in FIG. 6. The first column corresponds to a configuration with eight vectors of length 2, twelve scalars, two constants, and specialized scalars. The next-to-last configuration corresponds to three vectors of length 4; 16 scalars; two constants; and two specialized scalars. By the formula used to determine the accumulated distance, vectors having a depth increasing from 2 to 4 will be required in order to perform a calculation. If one needs to know $g(t-2, i), g(t-1, i), b(t-2, i), b(t-1, i)$ and $d(t-1, i)$ in order to calculate $g(t, i)$, then the configuration used will correspond to the value GMOD=0, and $g(t-2, i)$ will be assigned to W00; $g(t-1, i)$ will be assigned to W01; $b(t-2, i)$ will be assigned to W10; $b(t-1, i)$ will be assigned to W11; and $d(t-1, i)$ will be assigned to W21. Where quadrivectors are needed to calculate the accumulated distance, the configuration used will correspond to the value GMOD=2, with the vectors assigned in the following manner:

$$W00 = g(t - 4, i)$$
$$W01 = g(t - 3, i)$$
$$W02 = g(t - 2, i)$$
$$W03 = g(t - 1, i)$$
quadrivector $$W10 = b(t - 4, i)$$
$$W11 = b(t - 3, i)$$
$$W12 = b(t - 2, i)$$
$$W13 = b(t - 1, i)$$
quadrivector $$W20 = d(t - 1, i)) \text{ monovector}$$

Figure 2D:
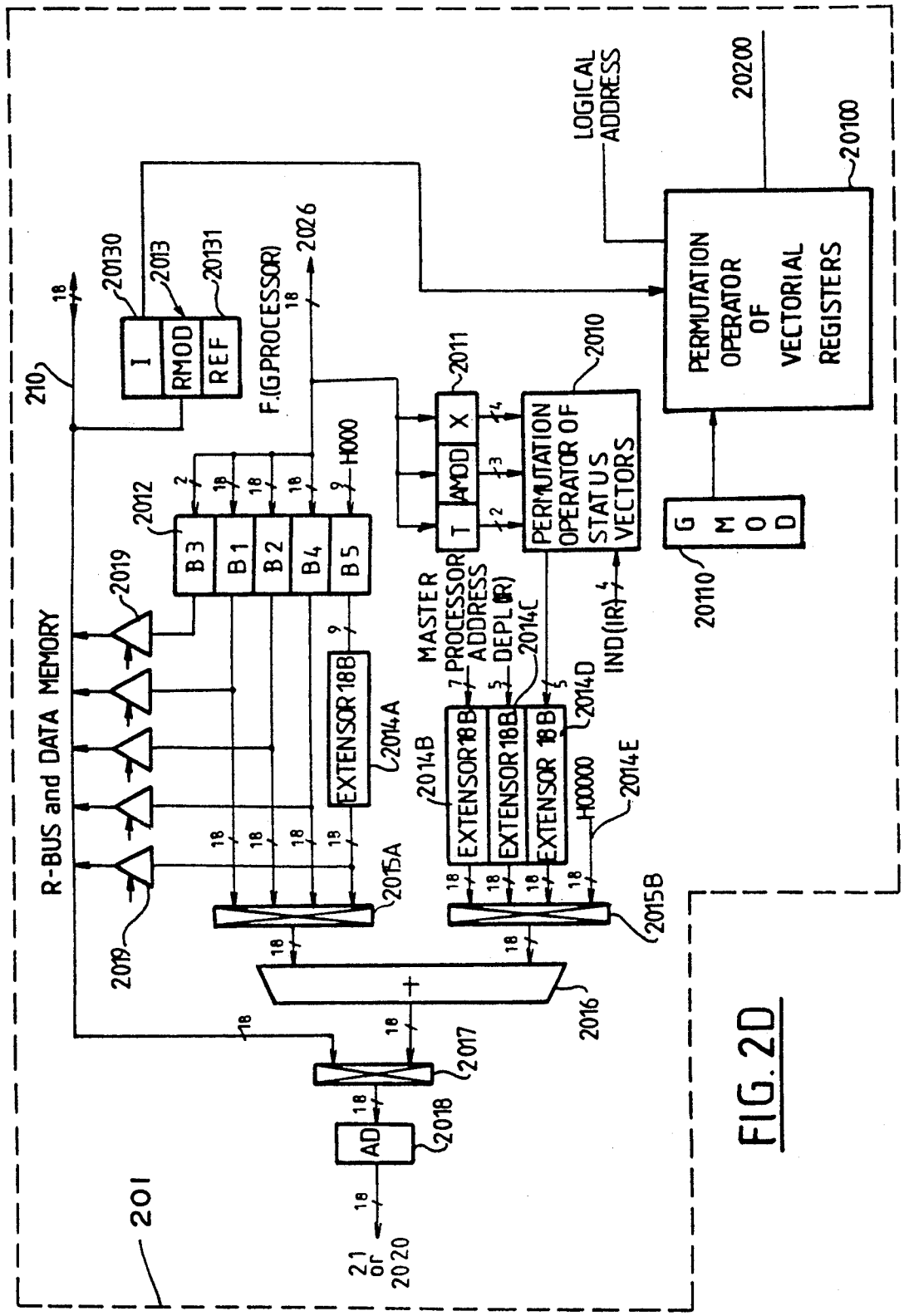
FIG. 2D is the functional diagram of the address calculating processor.

The management of the addresses, in particular for the bank of working registers (2020), and of the state vectors in local memory (21) is performed by the address calculation processor (201) (FIG. 2D). This address calculation processor includes a bank (2012) of registers (B1, B2, B3, B4, B5) the first four of which, (B1, B2, B3, and B4), are connected to the output of the buffer register (2026) of the general purpose calculating processor. This output is also connected to a bank of three registers (2011), comprising one two-bit register (T), one three-bit register (AMOD), and one four-bit register (X). The register (T) contains the two least significant bits of the t-subscript loop (test sequence); the register (X) contains the number of state vectors; and the register (AMOD) specifies the management mode of the state vectors. The register (B1) contains the addresses for the references or the tables; the register (B2) contains the addresses for the state vectors; the register (B3), limited to two bits, serves as an address complement for the indirections; register (B5) serves as a spatial counter to define the address at which refreshing of the dynamic memory should be performed. An RMOD register (2013) defines the refreshing frequency; a first counter I (20130) defines the subscript of loop (I) for the reference vectors, and a second counter REF (20131) defines when a refreshing of the dynamic memory should be performed. The nine bits of the register (B5) are sent to an extender (2014A), which extends the address to 18 bits, and the bank of registers (B1, B2, B4, B5) are sent to a multiplexer (2015A), the 18 outputs of which are sent to an adder (2016). A second multiplexer (2015B) receives the 18 outputs of each of the extenders (2014B, 2014C, 2014D) and a value of initialization to zero over the inputs (2014E). Over seven lines, the extender (2014B) receives the address furnished by the master processor. The second extender (2014C), over 5 DEPL lines (ir), and the extender (2014D), over 5 lines, receive the output of a state vector permutation operator (2010) defining the address of the state vectors in memory (21). The 18 outputs of the adder (2016) are sent to a multiplexer (2017), which at its other 18 inputs receives the data bus (210), and the 18 outputs of this multiplexer are sent to an address buffer register (2018).

The set of instructions includes a field (G.CODE) to command the general purpose processing calculator (G) and the check processor (S), and a second field, which may optionally control the address calculation processor and the distance calculation processor. In the G.CODE field permitting control of the operations of the general purpose processor depending on the type of code used, it is possible to cause the operator (2023) to execute one of the operations indicated in the following table:

| G.CODE: | 16-bit result: | one-bit result: |
|---|---|---|
| | 4 | RA + RB | (RA + RB > FFFF) |
| | 6 | RA − RB | (RB ≧ RA) |
| calculations: | 8 | RA + RB saturated | (RB = RA) |
| | 9 | (RA/2) + RB saturated | (1sb(RA)) |
| | 0 | RA + RB | x |

In order to perform the calculation of accumulated distance, calculations in a matrix are performed by recurrence, and the value at a point (t, i) is calculated as a function of the values at the point (t−1, i−1), (t−2, i−2), etc, depending on the type of equation used. The values that permit these calculations are stored in the working register (2020) in the manner explained above, and to promote the real-time aspect of the calculations, the attempt has been made to minimize the exchanges between these working registers and the local data memory (210). A specialized circuit (2010), known as the state vector permutation operator, makes it possible for the addressed processor to define the addresses of the state vectors in the memories (21), and another circuit (20100) defines the addresses of the vectors of the working registers (2020) that make it possible consequently to furnish the information to the general purpose processor for performing the calculation of accumulated distances. Thus, for example, if a formula for calculating accumulated distance is used that requires bivectors g(t−1), g(t−2), b(t−1), b(t−2) and d(t−1), then the latter will be stored in the working register (2020) in the following manner, after having selected GMOD as either zero or one. The bivectors are assigned in accordance with the following table:

$$W00 = g(t - 2, i) \brace W01 = g(t - 1, i)\} \text{bivector}$$

$$W10 = b(t - 2, i) \brace W11 = b(t - 1, i)\} \text{bivector}$$

$$W20 = d(t - 1, i)) \text{ monovector}$$

In this example we store two bivectors for the g and b matrices and a single vector for the d matrix. The purpose of this manipulation is to keep in memory only the absolute number of vectors necessary, and not to rewrite any but the two new values. At the end of the calculating operation, the processor write in the value g(t) in place of the old value g(t−2), the value b(t) in place of b(t−2) and d(t) in place of d(t−1). This makes it possible to economize by two memory accesses in the case of bivectors, and in the case where quadrivectors are needed, there is an economy of 6 memory accesses, which for a loop of 20 to 30 instructions makes a 10-20% gain in processing time possible. In the case of quadrivectors, the vectors g(t−4) through g(t−1) required for calculating g(t) will be stored in locations W00, W01, W10, W11, and after calculation of g(t) in the latter, will be assigned to location W00 of the bank of registers (2020) as shown in the case of FIG. 7 corresponding to phase (t). For the following calculation of g(t+1), the logical number of the vector will be added to the last two bits of the T register, which for the phase (t+1) causes the physical address of the register (R1) of FIG. 6 to correspond to the logical number 00, the physical address of the register (R2) to correspond to the number 01, the physical address of the register (R3) to correspond to the number (10), and the physical address of the register (R0) to correspond to the number (11). The contents of these registers are shown in the physical number column of FIG. 7, and the result g(t+1) is re-entered into the register having R1 as its physical number. For phase (t+2), the T register accordingly contains the value at "10" and causes the physical address of the register (R2) to correspond to the logical number 00, the physical address of the register (R3) to correspond to the logical number 01, the physical address of the register (R0) to correspond to the number 10, and the physical address of the register (R1) to correspond to the number (11), as can be seen in the column corresponding to phase (t+2) in FIG. 7. The result of the calculation that furnishes g(t+2) will be assigned to the physical address of the register (R2). The permutations are thus continued in such a way as to operate solely on nine vectors in the case where quadrivectors are needed for the calculation, and on 5 vectors in the case where bivectors are needed for calculating the accumulated distances. Similarly, in the case of calculations on the bivectors, only the last bit of register (T) will be used, which yields the number of iterations modulo 2, and in the case of the logical address will be equal to the physical address, when the number of iterations equals 0 modulo 2, and the logical address plus one (+1) will be equal to the physical address when the number of iterations equals 1 modulo 2.

Figure 3:
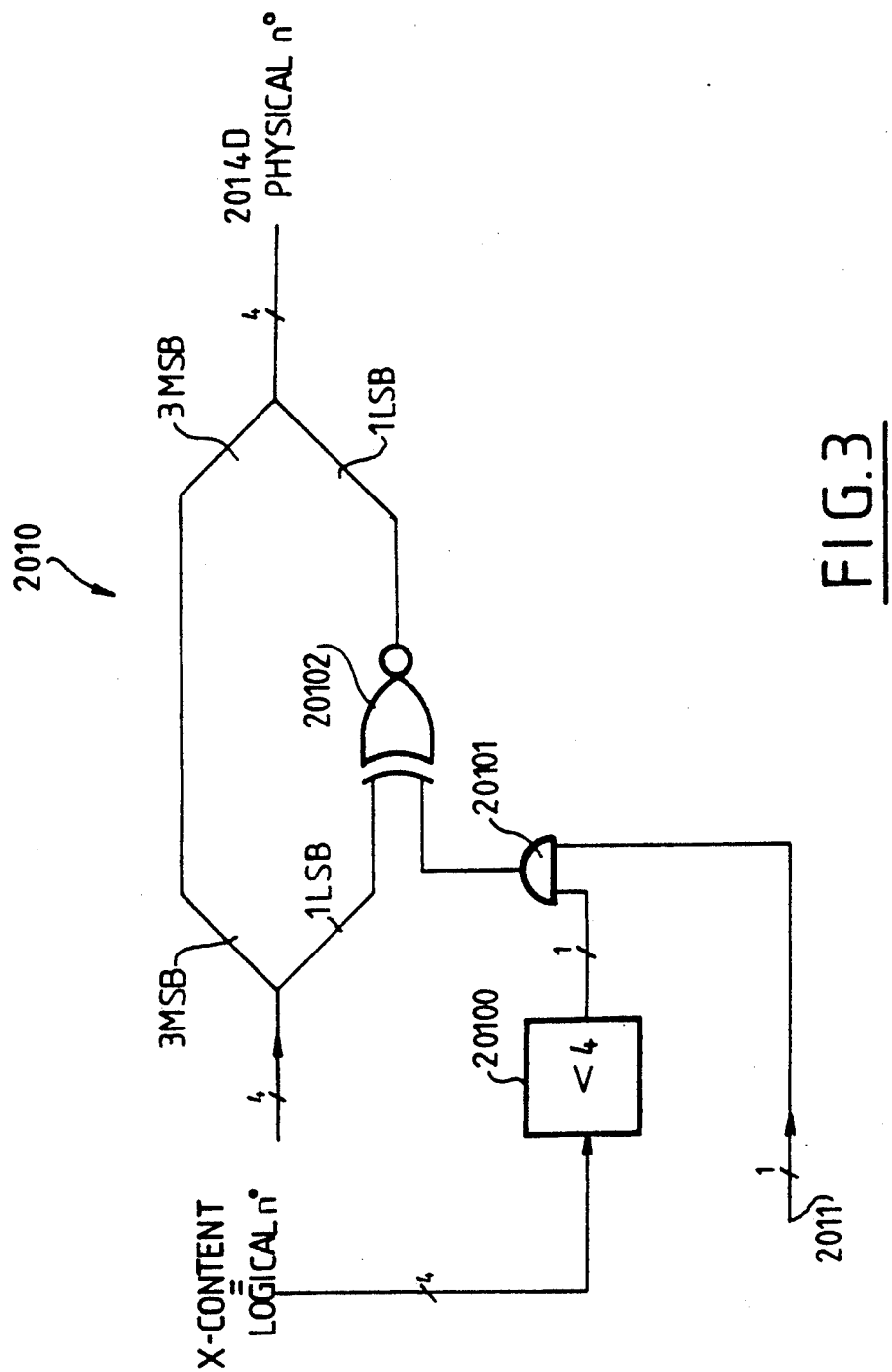
FIG. 3 shows a first variant embodiment of the calculating circuit for the address of the vectors neceaary for calculating the accumulated distance.

FIGS. 3 and 4, respectively, show an embodiment of the state vector permutation operator for bivectors and quadrivectors. The embodiment of the bivectors includes a comparator (20100), which on the basis of four logical address lines determines whether these addresses are less than four, and at its output produces a signal of level "1" when they are less than four. The output of the comparison circuit is sent to an AND gate (20101), another input of which receives the least significant bit (LSB) of the T register (2011). The output of this AND gate (20101) is sent to a comparator circuit (20102) comprising an EXCLUSIVE OR gate followed by an inverter. This circuit (20102), at its second input, receives the least significant bit of the logical address of the vectors formed with four bits, this logical address being furnished by the X register of the bank (2011), and then the least significant bit is furnished by the output of the circuit (20102) and combines with the other three bits (MSB) to furnish the physical address of the extender circuit (2014D). The circuit (20102) produces an output of level "1" when the two input signals are identical. Consequently, when the logical number of the vector equals 0 modulo 2 and the number of iterations equals 0 modulo 2, then the physical address equals the logical number increased by one, while when the logical number modulo two equals 1 and the iteration number equals 0, or the logical number modulo 2 equals 0 and the number of iterations equals 1, the physical address still is equal to the logical address. In the case where the logical number is greater than or equal to four, the physical address always remains equal to the logical address.

FIG. 4 shows the embodiment of the permutation operator (2010) of the state vectors in the case where the equation for calculating the accumulated distance requires two quadrivectors. In this case, the logical address furnished by the X register is sent to a comparator (20101), which compares this address with the value 8 and at its output furnishes a signal equal to one, in the case where it is less than the value of 8. The two least significant bits originating in the T register (2011) are sent to two AND gates (20103), each of which at its other input receives the output of the comparator (20100A). Each of the outputs of the AND gates (20103) is sent to one input of an adder (20104), which at its other two inputs receives the two least significant bits of the logical address furnished by the X register (2011). The two outputs of this adder (2104) are recombined with the two most significant bits (MSB) so as to define the physical address, which is sent to the extender register (2014D). The result of the operations performed on the logical address in accordance with the iteration phases of the calculation is shown in FIG. 7. In phase t, g(t), b(t) has been calculated, and these last two are assigned to the physical addresses (R0 and R4). In phase (t+1), the logical address is added to the two bits of the T register "01" and gives the physical address of the elements necessary for the calculations. The calculation performed on the elements (R0-R3) will make it possible to determine g(t+1), and the calculation performed on the elements (R4-R7) will make it possible to determine b(t+1). The values g(t+1) and b(t+1) are assigned to the physical addresses (R1 and R5). In phase (t+2), the result of the calculation has been shown directly, comprising adding to the logical address the contents of the register (T), which when it occurs is the value "10". This mode of managing the state vectors makes it possible to minimize the permutation and replacement operations to be performed on the latter following a calculation, and consequently makes it possible to accelerate the speed of calculation of the system.

FIG. 5 represents a final embodiment, with which it is possible, as a function of the AMOD register and the index vector (X), to manage all the cases of the functional figure corresponding either to a bivector or a quadrivector for the state vectors. The circuit and functioning for the vectors of the working registers (2020) are identical, except that the comparator (20100B) compares the bits 1, 2, 3 with the values 12 and 16, instead of the values 2, 4, 6, 8 below, and the function of the logical circuit (20105) is identical. In this embodiment, the two least significant bits of the X register (2011) are sent to two inputs of the adder (20104), which at its other two inputs receives the outputs of the two AND gates (20103), respectively. Each AND gate (20103) receives one of the two bits of the T register (2011) at one input, and at its other input a correction signal for the bit (1) and/or the bit (0), depending on the gate in question. These signals, CORRBIT1 and CORRBIT0, originate in a logical circuit (20105) which at its input receives the three lines of the AMOD register (2011) and one of the four activated outputs of a multiple comparator circuit (20100B). The multiple comparator circuit (20100B) compares the X register, containing the logical address, with the values 2, 4, 6, 8 in succession and positions the output corresponding to the value "1" following the logical address that has been sent. In the case where a bivector is involved, only the CORRBIT0 output is at "1" and makes it possible to effect the correction of the bit 0 (the least significant bit) of the logical address, while in the case where a quadrivector is involved, the two outputs CORRBIT1 and CORRBIT0 are both at the value "1", which makes it possible to correct the two least significant bits when the logical address is at 0 and 1 of the logical address in the manner already described for FIG. 4. The logical circuit (20105), as a function of the values of AMOD included between 1 and 5 and because of the fact that the value of the X register is less than 2, 4, 6 or 8, furnishes a signal CORRBIT0 or CORRBIT1 having the values listed in the boxes of the matrix table of FIG. 8. Thus, if AMOD equals "1" and X is less than "2", then CORRBIT0 equals "1" and CORRBIT1 equals "0". This indicates a calculation with a bivector and the correction takes place solely for the least significant bit of the logical address. In the case AMOD equals 4 and X is less than 4, or AMOD equals 5 and X is less than 8, then CORRBIT0 and CORRBIT1 are both at "1", which enables performing the correction on the 0 and 1 bits of the logical address.

Similarly, a vector register permutation operator (20100), similar to some modifications by the operator (2010), furnishes at its output (20200) the physical addresses of the vectors of the working registers (2020). This operator (20100) receives the output of the GMOD register (20110), which as has been seen above defines the configuration of the bank of working registers (2020). This operator (20100) also receives the two least significant bits of the counter I (20130) having the loop subscript, and the four logical address bits making it possible for the circuit (20100) to define the four physical address bits (20200) which permit addressing one of the 32 working registers (2020).

All the calculations of accumulated distance are performed by scanning the matrices by the above process, comprising, for a test event of the test sequence, scanning all the references of the processes (1−P), and then scanning all these references of the processes (1−P) for the following test event, and permitting processing of the events of the test phrase at the rate at which they arrive.

In fact, there are various ways to initiate the calculations of accumulated distance for a set of processes (P1-PP) stored in a set of reference matrices (r1-rP) as a function of the course of the test sequence. These various ways of initiating the calculation of accumulated distance are shown in FIGS. 9a, 9b and 9c, respectively. For a given reference of the reference matrix (r1,) the method of FIG. 9c comprises scanning the entire test sequence, which is then scanned by a second reference of this same matrix until the end of the matrix, and then shifting to the following matrix (r2) corresponding to the method (P2). This processing method has the advantage of requiring less space in memory for the intermediate results, since the calculations are performed in only one matrix at a given instant. The second solution shown in FIG. 9b comprises, for a test event of the test sequence, scanning all the references of one matrix (r1), then for a second event of the test sequence scanning the same set of references of the matrix (r1), until all the events of the test sequence have been scanned, and then shifting to the scanning route processing the first event of the test sequence with the set of references of the matrix (r2) corresponding to the method (P2), and so forth until the method (PP). This intermediate solution is of no interest whatever. Moreover, this solution, like the first, has the disadvantage of requiring a wait until the end of the spoken utterance, corresponding to the end of the test sequence, before beginning the calculations.

The solution corresponding to FIG. 9a is the most powerful solution selected for performing calculation of the distances. The advantage of this processing method, which comprises scanning all the references of the processes (1−P) for one test event of the test sequence, and then scanning all these references of the processes (1−P) for the following test event, is that it enables processing of the events of the test phrase at the rate at which they arrive. This solution requires additional memory space, but considering the size of the local memories (21) this is not a hindrance.

The circuit of the invention accordingly makes it possible to perform the dynamic comparison with programmable local equations, while having increased power making possible recognition in real time. This circuit may advantageously be used in speech recognition systems.

Further modifications within the competence of one skilled in the art are also part of the spirit and scope of the invention.

We claim:

1. An integrated dynamic programming circuit for recognition of spoken words including a circuit (204) for interface with the data and address bus (30) of a master system (40), means for connecting said interface circuit to an internal bus (210) for access to a local memory (21) containing a reference matrix corresponding to words to be recognized, to a sequencing processor (206), to a circuit (207) for decoding instructions and for logical checking, and to a program memory (205), means for connecting the internal bus (210) in parallel to a unit including a distance (d(t,i)) calculating processor (203) and a frame memory (2030); said distance calculation processor being connected to a unit including a general purpose calculating processor (202) having a first buffer (2021) and a second buffer (2022) operationally connected to a bank of working registers (2020), the output of the general purpose calculating processor being connected to unit including an address calculating processor (201), the general purpose calculating processor (202) further comprising operator means for, in accordance with the instructions stored in the program memory (205), performing any combination of the following operations: comparison operation, complementing operation on the content of the second buffer (2022), saturation operation, addition operation, and shift operation on the information contained in the first register (2021); and output of the operator means being connected to an intermediate component, selected from the group comprising a multiplexer and a buffer register, and means feeding said output back to the bank of working registers (2020), means connected to the bank of working registers (2020) for modifying the bank of working registers, in configuration according to the values of a general mode register for taking into account needs of a programmable local equation g(t,i) of the general purpose calculating means such that the optimal route to arrive at a point (i,j) is determined, and consequently the recognition of a word with respect to the reference matrix is achieved, wherein the local equation is an accumulated distance between a word and the reference matrix; and wherein the address calculating processor (201) includes a comparator circuit means (20100) for calculating the physical addresses of the registers of the bank (2020) upon which the general purpose calculating processor (202) performs the calculation corresponding to the local equation.

2. An integrated dynamic programming circuit as defined by claim 1, characterized in that, for determining the two least significant bits of the physical address, said comparator circuit means includes adder means (20104) connected for receiving on the one hand the two least significant bits or a logical address of one of the working registers (2020) upon which the calculation are performed, the working registers having logical addresses corresponding to their physical addresses, which logical addresses change over time and on the other hand two bits comprising the two outputs of two AND gates (21003), each of said AND gates receiving one of the two least significant bits and the output of a comparator logic circuit (20100A, 20100B, 20105) determining a correction to be performed on the value of the least significant bits.

3. A circuit as defined by claim 2, characterized in that the comparator circuit means includes a first comparator circuit (20100A) determining the correction to be performed on the value of the least significant bits of the physical address when a decimal value of a logical address number which represents the four logical addresses is less than 8.

4. An integrated dynamic programming circuit as defined by claim 3 wherein elements of the reference matrix or the events of a test sequence are obtained by processing acoustical signals by, further including means for predistorting of first order equation $y_n = x_n - \alpha \cdot x_n - 1$, where $x_n$ is a succession of signal samples arriving from an analog to digital converter after preamplification and filtering by a low-pass filter for predistorting the acoustical signal;

means for calculating the Fourier transform on the result of the product of the signal by the function "1+cosine" to obtain 128 coefficients;

means for multiplying the 128 coefficients with a succession of trigonometric functions and calculating of the integral of the result, to reduce the number of coefficients from 128 to 16;

means for modifying a 16-bit representation of the coefficients to a 8-bit representation; and means for nonlinear temporal compression of the coefficients using the Minkowski distance between vectors.

5. A circuit as defined by claim 4, further including means for linear combining the coefficients by processing by cosine Fourier transform on 16 parameters, to change to 8 parameters of 8 bits, before nonlinear temporal compression.

6. An integrated dynamic programming circuit as defined by claim 2 wherein elements of the reference matrix or the events of a test sequence are obtained by processing acoustical signals by, further including means for predistorting of first order equation $y_n = x_n - \alpha \cdot x_n - 1$, where $x_n$ is a succession of signal samples arriving from an analog to digital converter after preamplification and filtering by a low-pass filter for predistorting the acoustical signal;

means for calculating the Fourier transform on the result of the product of the signal by the function "1+cosine" to obtain 128 coefficients;

means for multiplying the 128 coefficients with a succession of trigonometric functions and calculating of the integral of the result, to reduce the number of coefficients from 128 to 16;

means for modifying a 16-bit representation of the coefficients to a 8-bit representation; and means for nonlinear temporal compression of the coefficients using the Minkowski distance between vectors.

7. A circuit as defined by claim 6, further including means for linear combining the coefficients by processing by cosine Fourier transform on 16 parameters, to change to 8 parameters of 8 bits, before nonlinear temporal compression.

8. A circuit as defined by claim 2, characterized in that the comparator logic circuit (20200A, 20100B, 20105) for determining the correction to be performed includes a logic circuit (20105) furnishing two correction outputs CORRBIT0 and CORRBIT1 respectively for the least significant and next least significant bit as a function of the values furnished a register AMOD specifying a management mode of a state vector and by a second comparator circuit (20100B) making a comparison with each of the following values: 2, 4, 6, 8.

9. An integrated dynamic programming circuit as defined by claim 8 wherein elements of the reference matrix or the events of a test sequence are obtained by processing acoustical signals by, further including
means for predistorting of first order equation $y_n = x_n - \alpha \cdot x_n - 1$, where $x_n$ is a succession of signal samples arriving from an analog to digital converter after preamplification and filtering by a low-pass filter for predistorting the acoustical signal;
means for calculating the Fourier transform on the result of the product of the signal by the function "1+cosine" to obtain 128 coefficients;
means for multiplying the 128 coefficients with a succession of trigonometric functions and calculating of the integral of the result, to reduce the number of coefficients from 128 to 16;
means for modifying a 16-bit representation of the coefficients to a 8-bit representation; and
means for nonlinear temporal compression of the coefficients using the Minkowski distance between vectors.

10. A circuit as defined by claim 9, further including means for linear combining the coefficients by processing by cosine Fourier transform on 16 parameters, to change to 8 parameters of 8 bits, before nonlinear temporal compression.

11. An integrated dynamic programming circuit as defined by claim 1 wherein elements of the reference matrix or the events of a test sequence are obtained by processing acoustical signals by, further including
means for predistorting of first order equation $y_n = x_n - \alpha \cdot x_n - 1$, where $x_n$ is a succession of signal samples arriving from an analog to digital converter after preamplification and filtering by a low-pass filter for predistorting the acoustical signal;
means for calculating the Fourier transform on the result of the product of the signal by the function "1+cosine" to obtain 128 coefficients;
means for multiplying the 128 coefficients with a succession of trigonometric functions and calculating of the integral of the result, to reduce the number of coefficients from 128 to 16;
means for modifying a 16-bit representation of the coefficients to an 8-bit representation; and
means for nonlinear temporal compression of the coefficients using the Minkowski distance between vectors.

12. A circuit as defined by claim 11, further including means for linear combining the coefficients by processing by cosine Fourier transform on 16 parameters, to change go 8 parameters of 8 bits before nonlinear temporal compression.

13. A circuit as defined by claim 1, further including an EXCLUSIVE NOR gate, receiving as a first input the least significant bit of the physical address and as second input the output of an AND gate (20101) having two inputs, the first input receiving the output of a comparator circuit which outputs a logical "1" if the logical offset is lower than the value 4 and the second input being the least significant bit of a loop index (T) T dependent on iterations of calculations.

14. An integrated dynamic programming circuit as defined by claim 13 wherein elements of the reference matrix or the events of a test sequence are obtained by processing acoustical signals by, further including
means for predistorting of first order equation $y_n = x_n - \alpha \cdot x_n - 1$, where $x_n$ is a succession of signal samples arriving from an analog to digital converter after preamplification and filtering by a low-pass filter for predistorting the acoustical signal;
means for calculating the Fourier transform on the result of the product of the signal by the function "1+cosine" to obtain 128 coefficients;
means for multiplying the 128 coefficients with a succession of trigonometric functions and calculating of the integral of the result, to reduce the number of coefficients from 128 to 16;
means for modifying a 16-bit representation of the coefficients to a 8-bit representation; and
means for nonlinear temporal compression of the coefficients using the Minkowski distance between vectors.

15. A circuit as defined by claim 14, further including means for linear combining the coefficients by processing by cosine Fourier transform on 16 parameters, to change to 8 parameters of 8 bits, before nonlinear temporal compression.

16. An integrated dynamic programming circuit as defined by claim 1 wherein elements of the reference matrix or the events of a test sequence are obtained by processing acoustical signals by, further including
means for predistorting of first order equation $y_n = x_n - \alpha \cdot x_n - 1$, where $x_n$ is a succession of signal samples arriving from an analog to digital converter after preamplification and filtering by a low-pass filter for predistorting the acoustical signal;
means for calculating the Fourier transform on the result of the product of the signal by the function "1+cosine" to obtain 128 coefficients;
means for multiplying the 128 coefficients with a succession of trigonometric functions and calculating of the integral of the result, to reduce the number of coefficients from 128 to 16;
means for modifying a 16-bit representation of the coefficients to a 8-bit representation; and
means for nonlinear temporal compression of the coefficients using the Minkowski distance between vectors.

17. A circuit as defined by claim 16, further including means for linear combining the coefficients by processing by cosine Fourier transform on 16 parameters, to change to 8 parameters of 8 bits, before nonlinear temporal compression.

18. A circuit as defined by claim 1 wherein the distance calculating processor (203) calculate a distance between vectors representing the reference acoustical images stored in the local memory (21) and vectors representing the test sequence image stored in the frame memory (2030).

19. A circuit as defined by claim 1, wherein the operation performed by general purpose calculating processor (202) is selected in accordance with a code G.COD.

20. A circuit according to claim 19 wherein the configuration of the bank of working registers (2020) is selected among four possible configurations.

21. A circuit according to claim 20, wherein the first configuration is constituted by 8 vectorial registers of two elements WX0, WX1, with X varying from 0 to 7, and 12 scalars register (S12 to S27) and four specialized registers.

22. A circuit according to claim 20, wherein the second configuration is constituted by a 6 vectorial registers of two elements WX0, WX1 with X varying from 0 to 5, 16 scalars registers (S12, S27) and four specialized registers.

23. A circuit according to claim 20, wherein the configuration is constituted by 3 vectorial registers of four element, WX0, WX01, WX02, WX03 with X varying from 0 to 2, 12 scalars registers (S12 to S27) and four specialized registers.

24. A circuit according to claim 20, wherein the four configurations is constituted by 28 scalars registers S0 to S27.

25. A circuit according to claim 1 wherein the configuration of the bank of working registers (2020) is selected among four possible configurations.

26. A circuit according to claim 1 wherein the local equation depends upon a local distance d between a point t and a point i and depends upon an accumulated distance g between a point 0, 0 and a point t,i.

27. A circuit according to claim 26 wherein the local equation is the minimum of:
$g(t, i-1)$;
$g(t-1, i-1) + d(t,i)$; and
$g(t-1, i) + d(t,i)$.

28. A circuit according to claim 26 wherein the local equation is the minimum of:
$g(t, i-1) + d(t,i)$;
$g(t-1, i-1) + 2 \times d(t,i)$; and
$g((t-1, i) + d(t,i)$.

29. A circuit according to claim 26 wherein the local equation is the minimum of:
$g(t, i-1) + d(t,i)$;
$g(t-1, i-1) + d(t,i)$; and
$g(t-1, i)$.

30. A circuit according to claim 26 wherein the local equation is the minimum of:
$g(t-1, i-2) + d(t, i-1)/2 + d(t,i)/2$;
$g(t-1, i-1) + d(t,i)$; and
$g(t-2, i-1) + d(t-1, i) + d(t,i)$.

31. A circuit according to claim 26 wherein the local equation is the minimum of:
$g(t-1, i-2) + 2 \times d(t, i-1) + d(t,i)$;
$g(t-1, i-1) + 2 \times d(t,i)$; and
$g(t-2, i-1) + 2 \times d(t-1, i) + d(t,i)$.

32. A circuit according to claim 26 wherein the local equation is the minimum of:
$g(t-1, i-2) + d(t,i)$;
$g(t-1, i-1) + d(t,i)$; and
$g(t-2, i-1) + 2 \times d(t,i)$.

33. A circuit according to claim 26 wherein the local equation is the minimum of:
$g(t-1, i-2) + 3 \times d(t,i)$;
$g(t-1, i-1) + 2 \times d(t,i)$; and
$g(t-2, i-1) + 3 \times d(t,i)$.

34. A circuit according to claim 26 wherein the local equation is the minimum of:
$g(t-1), i-1) + d(t,i)$;
$g(t-1, i-2) + d(t,i)$;
$g(t-1, i-3) + d(t,i)$; and
$g(t-1, i+4) + d(t,i)$.

* * * * *

UNITED STATES PATENT AND TRADEMARK OFFICE
CERTIFICATE OF CORRECTION

PATENT NO. : 5,216,748

DATED : June 1, 1993

INVENTOR(S) : Georges QUENOT; Jean-Jacques GANGOLF; Joseph MARIANI; Jean-Luc GAUVAIN It is certified that error appears in the above-identified patent and that said Letters Patent is hereby corrected as shown below:

Claim 1, line 18, (line 37 of column 13), after "to" insert -- a --;

Claim 1, line 27 (line 46 of column 13), change "and" to -- an --;

Claim 2, line 7, (line 4 of column 14), change "calculation" to

-- calculations --;

Claim 8, line 2, (line 7 of column 15), change "20200A" to -- 20100A --;

Claim 12, line 4, (line 67 of column 15), change "go" to -- to --;

Claim 13, line 8, (line 8 of column 16), delete -- (T) --;

Claim 22, line 2, (line 13 of column 17), delete -- a --;

Claim 34, line 6, (line 36 of column 18), change "i + 4" to -- i - 4 --.

Signed and Sealed this

Fifteenth Day of February, 1994

Attest:

BRUCE LEHMAN

Attesting Officer

Commissioner of Patents and Trademarks